Oct. 27, 1925
J. E. WOOD
1,558,660
COMBINED PRESSURE GAUGE AND VALVE CAP
Filed Jan. 17, 1924
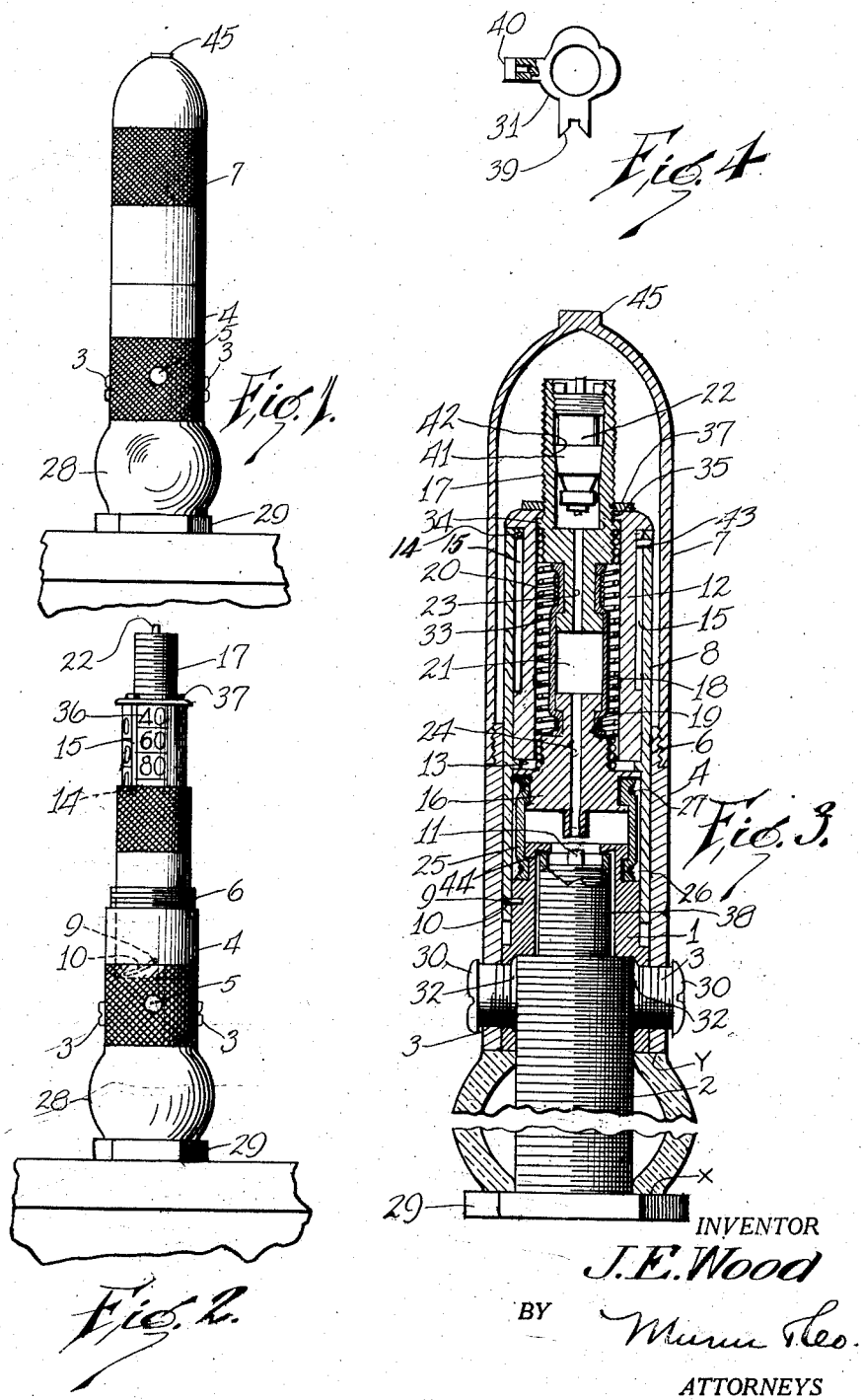
INVENTOR
J. E. Wood
BY
ATTORNEYS Patented Oct. 27, 1925.

1,558,660

UNITED STATES PATENT OFFICE.

JOSEPH E. WOOD, OF CHICAGO, ILLINOIS, ASSIGNOR TO W. LEE PROVOL, OF CHICAGO, ILLINOIS.

COMBINED PRESSURE GAUGE AND VALVE CAP.

Application filed January 17, 1924. Serial No. 686,901.

*To all whom it may concern:*

Be it known that I, JOSEPH E. WOOD, a citizen of the United States, and a resident of Chicago, in the county of Cook and State of Illinois, have invented a new and useful Improvement in Combined Pressure Gauge and Valve Caps, of which the following is a full, clear, and exact description.

My invention relates to improvements in combined pressure gauge and valve cap, and it consists in the combinations, constructions, and arrangements herein described and claimed.

An object of my invention is to provide a combined pressure gauge and valve cap which may be readily secured to the valve of a tire and which is adapted to indicate the pressure of the air within the tire when manually actuated.

A further object of my invention is to provide a device of the type described in which the pressure indicating member is adapted to hold all of the air that escapes from the inner tube when the device is used as a pressure gauge, whereby an accurate measurement of the pressure within the tire is assured.

A further object of my invention is to provide a device of the type described which may be locked to the valve so as to prevent the removal of the same.

A further object of my invention is to provide a device of the type described which is relatively simple in construction, durable, and efficient for the purpose intended, and which is not likely to get out of order easily.

Other objects and advantages will appear in the following specification, and the novel features of the invention will be particularly pointed out in the appended claims.

My invention is illustrated in the accompanying drawings, forming part of this application, in which Figure 1 is a side elevation of the device, Figure 2 is a view similar to Figure 1, but with the dust cap removed and the indicator showing the air pressure within the tire, Figure 3 is an enlarged vertical section through the device, Figure 4 is a view of the key used with the device.

In carrying out my invention I provide a body portion 1 that is adapted to be threaded upon an enlarged portion of a tire valve and to be locked in place by means of set screws 3, (see Figure 3). A casing 4 encloses the body portion 1 and is secured thereto by means of a set rivet 5. The casing 4 has a threaded portion 6 that receives a dust cap 7.

The casing 4 also carries the pressure gauge mechanism which will now be described. A sleeve 8 is disposed in the casing 4 and is secured to the body portion 1 by means of a pin 9. As clearly shown in Figure 2, the pin 9 is slidably disposed in an arcuate-shaped groove 10. The groove 10 is fashioned so as to cause the sleeve 8 to be moved downwardly, the sleeve when moved downwardly being adapted to open the valve 11 in a manner hereinafter described. An indicating device 12 is slidably disposed in the sleeve 8 and is limited in its movement with respect to the sleeve 8 by a flange 13 and lugs 14. As clearly shown in Figure 3, each lug 14 is slidably received in a groove 15 of the indicator 12. The groove 15 does not extend to the lower end of the indicator 12 and therefore prevents the indicator from being withdrawn from the sleeve 8. The lug 14 of the sleeve 8 is bent inwardly after the indicator is disposed within the sleeve.

The indicator 12 is adapted to be moved outwardly in the sleeve 8 when the valve 11 is opened, whereby the indicator 12 will show the number of pounds of air within the tire. The means for moving the indicator 12 with respect to the sleeve 8 comprises a valve actuating member 16 and a valve casing 17. The member 16 and the casing 17 are connected to each other by a flexible hose 18 that is adapted to be expanded when air is received therein under pressure. The hose 18 is securely fastened to the member 16 by wire 19 or other like fastening means, and to the casing 17 by wire 20. As clearly shown in Figure 3, the adjacent ends of the members 16 and 17 and the hose 18 form an air compartment 21. The valve 22, similar to the valve 11, is disposed in the casing 17. The casing 17 has a passageway 23 that places the valve 22 in communication with the compartment 21. A passageway 24 places the compartment 21 in communication with the valve 11. In the same manner as the member 16 is connected to the casing 17, the body portion 1 is connected to the member 16. A flexible cylindrical member 25 is secured to the body portion 1 by means of wire 26 and is also secured to the member 16 by means of wire 27.

From the foregoing description of the various parts of the device, the operation thereof may be readily understood. The device may be readily assembled to a valve 2 in the same manner as an ordinary valve cap. A rubber sleeve 28 is disposed between the lower end of the device and the nut 29 that is normally disposed on the valve 2. The device is screwed down upon the valve 2 so as to cause the sleeve 28 to bulge as shown in Figures 1 and 2. The tendency of the sleeve 28 to straighten is sufficient to form a water-tight connection at X and Y and to prevent the accidental turning of the device upon the valve 2. In addition to this, the device is adapted to be locked to the valve by means of set screws 3. The members 30 of these screws are shaped differently in different forms of the device, whereby a certain key 31, (see Figure 4) will have to be used to release said screws from the valve 2. It will also be noted that the inner ends of the set screws 3 are enlarged at 32 so as to prevent the removal of the screws from the device. The heads 30 prevent the screws from being turned into the interior of the device.

The device when secured to the valve takes the appearance as shown in Figure 1. When the driver wishes to test the pressure of the air within the tire, he first removes the dust cap 7 and then turns the sleeve 8 so as to cause the pin 9 to move the sleeve downwardly. The sleeve in its movement downwardly carries the member 16 into engagement with the valve 11. This movement therefore opens the valve and allows air to enter from the tire to the space between the portion 1 and the member 16. This air being under pressure, instantly flows through the passageway 24 and into the chamber 21. The valve 22 prevents the air from flowing out through the casing 17. The air is thus locked within the chamber 21 and expands so as to increase the size of the chamber. This expansion is against the tension of a spring 33 that secures the member 16 to the casing 17. As the chamber expands, it moves the casing 17 with respect to the member 16. It will be seen from Figure 3 that the member 16 bears against the flange 13 and is thus prevented from movement. The casing 17 has a shoulder 34 that bears against a shoulder 35 of the indicator 12. Movement of the casing 17 will therefore move the indicator 12 into the exposed position shown in Figure 2. The movement of the indicator 12 is directly proportional to the air pressure within the tire, and therefore the indicator will accurately show the air pressure. In the present form of the device, I have shown the outer surface of the indicator 12 as being provided with a number of columns of numbers 36, whereby the number of pounds of pressure within the tire may be easily read no matter in what position the device is disposed with respect to the tire. I have also shown three grooves 15 in the present form of the device, although one or more grooves is entirely sufficient. The casing 17 is locked in place to the indicator 12 by means of a nut 37.

As long as the sleeve 8 is kept in its downward position, air will flow directly from the tire to the compartment 21. After the pressure of the tire has been ascertained, the casing 8 may be turned so as to remove the member 16 from the valve 11. When this operation takes place, the spring 33 will move the indicator 12 back into normal position, whereupon the dust cap may be again disposed upon the casing 4.

The dust cap is also removed when the tire is filled with air. The outer wall of the casing 17 is threaded and is of the same diameter as the diameter of the small portion 38 of the valve 2. The air inlet pipe may therefore be secured to the casing 17 instead of to the valve 2. Air may then be forced through the valve 22, the passageway 23, the chamber 21, passageway 24, valve 11, and into the tire. It will be noted from Figure 3 that the portions of the member 16 and casing 17 that receive the spring 33 are threaded. The spring is therefore received in the grooves of the thread and provides a novel means of securing the spring to the member 16 and the casing 17. The device is very compact and resembles an ordinary dust cap when disposed upon the tire valve.

The valve 22 has a gasket 41 that seats against the tapered portion 42. The valve 22 acts as a second check and prevents any air that might escape through the valve 11 from passing out of the casing 17. As shown in Figure 3, a rivet 43 takes the place of one of the lugs 14 and extends into the groove 15. The upper end of the body portion 1 is provided with a groove 44 that receives the upper edge of the valve casing 2. The wall of the groove is tapered whereby it will engage with the inner edge of the casing so as to provide an air tight joint. This construction does away with the need of packing.

After the indicator 12 has been moved into the position shown in Figure 2, the air may be released from the compartment 21 by opening the valve 22. This may be done by pressing on the valve plunger with the projection 45 of the dust cap 7.

As stated above, one advantage of this device is that it may be locked in position without any danger of removal by thieves. The set screw 30 has a slot so fashioned as to admit only the extension 39 of the key 31. This set screw has a central portion arranged to enter the central slot in the extension 39, and this central portion of the set screw will prevent a device like a screw driver from entering the slot in the set screw. This necessitates the use of this particular key to unlock the device, and of course, the particular key is only carried by the owner.

I claim:

1. A device of the type described comprising a casing, an air pressure indicating member adapted to move with respect to said casing, and an expansible air receiving compartment connecting said indicator with a tire valve, the walls of said compartment enclosing the upper portion of said valve.

2. A device of the type described comprising a casing, an air pressure indicating member adapted to move with respect to said casing, and an expansible air receiving compartment connecting said indicator with a tire valve, the walls of said compartment enclosing the upper portion of said valve, and means for opening the valve to admit air to said compartment.

3. A device of the type described comprising a casing, an air pressure indicating member adapted to move with respect to said casing, an expansible air receiving compartment connecting said indicator with a tire valve, the walls of said compartment enclosing the upper portion of said valve, and means for limiting the expansion of said compartment.

4. A device of the type described comprising a casing adapted to cover a valve stem, and a flexible sleeve disposed on the valve and having its ends bearing against the base of the valve and against the bottom of said casing, whereby said sleeve prevents the accidental rotation of said casing on said valve, and also keeps foreign matter from contacting with the valve.

JOSEPH E. WOOD.